US012559999B2

(12) United States Patent
Chevalier

(10) Patent No.: US 12,559,999 B2
(45) Date of Patent: Feb. 24, 2026

(54) LATCHING SYSTEMS FOR LATCHING MOVABLE PANELS

(71) Applicant: John Phillip Chevalier, London (GB)

(72) Inventor: John Phillip Chevalier, London (GB)

( * ) Notice: Subject to any disclaimer, the term of this patent is extended or adjusted under 35 U.S.C. 154(b) by 92 days.

(21) Appl. No.: 18/480,422

(22) Filed: Oct. 3, 2023

(65) Prior Publication Data

US 2024/0026714 A1 Jan. 25, 2024

Related U.S. Application Data

(63) Continuation of application No. 17/643,284, filed on Dec. 8, 2021, now Pat. No. 11,808,064, which is a (Continued)

(30) Foreign Application Priority Data

Apr. 8, 2016 (GB) ..................................... 1606039

(51) Int. Cl.
*E05B 83/24* (2014.01)
*E05B 77/04* (2014.01)
(Continued)

(52) U.S. Cl.
CPC .............. *E05B 83/24* (2013.01); *E05B 77/04* (2013.01); *E05B 77/36* (2013.01); *E05B 77/54* (2013.01);
(Continued)

(58) Field of Classification Search
CPC .......... E05B 83/24; E05B 83/26; E05B 77/04; E05B 77/36; E05B 77/54; E05B 81/14;
(Continued)

(56) References Cited

U.S. PATENT DOCUMENTS 3,905,624 A * 9/1975 Fujita ...................... E05B 83/16 292/216
5,738,393 A * 4/1998 Chao ....................... E05B 83/24 292/216

(Continued)

FOREIGN PATENT DOCUMENTS

CN 101886499 11/2010
CN 102765426 A * 11/2012 ............. E05B 83/24

(Continued)

*Primary Examiner* — Kristina R Fulton
*Assistant Examiner* — James Edward Ignaczewski
(74) *Attorney, Agent, or Firm* — Levine Bagade Han LLP

(57) ABSTRACT

An automobile comprising wheels and a body has front lights, a front trunk lid above a front trunk for storing luggage, a front windscreen, a front occupant steering position, a roof, a rear windscreen, a rear hood above an internal combustion, hybrid or electrical or other drive system and rear lights, a latching system being provided in or near the front trunk and has a striker mounted to the front trunk lid and a catch system mounted to the body on mounting brackets, the latching system having a striker movable relative to first and second catches which are adapted to cooperate with the striker to limit relative movement therebetween, a single motor being provided to transmit drive through the latching system to drive both of the catches to positions in which movement of the striker is restricted by the catches.

15 Claims, 9 Drawing Sheets

Related U.S. Application Data continuation of application No. 16/089,659, filed as application No. PCT/GB2017/050946 on Apr. 5, 2017, now Pat. No. 11,220,848.

(51) Int. Cl.

| | |
|---|---|
| ***E05B 77/36*** | (2014.01) |
| ***E05B 77/54*** | (2014.01) |
| ***E05B 81/14*** | (2014.01) |
| ***E05B 81/20*** | (2014.01) |
| ***E05B 81/66*** | (2014.01) |
| ***E05B 83/26*** | (2014.01) |
| ***E05B 85/26*** | (2014.01) |

(52) U.S. Cl.

CPC .............. *E05B 81/14* (2013.01); *E05B 81/20* (2013.01); *E05B 81/66* (2013.01); *E05B 83/26* (2013.01); *E05B 85/26* (2013.01); *E05Y 2900/536* (2013.01)

(58) Field of Classification Search

CPC .......... E05B 81/20; E05B 81/66; E05B 85/26; E05Y 2900/536

USPC ........................................................... 292/11

See application file for complete search history.

(56) References Cited

U.S. PATENT DOCUMENTS

| | | | | |
|---|---|---|---|---|
| 5,915,766 | A * | 6/1999 | Baumeister | B04B 7/06 292/201 |
| 6,942,259 | B2 * | 9/2005 | Marzolf | E05B 85/247 292/216 |
| 8,646,816 | B2 * | 2/2014 | Dziurdzia | E05B 17/0029 292/216 |
| 9,863,170 | B2 * | 1/2018 | Park | E05B 77/08 |
| 11,220,848 | B2 | 1/2022 | Chevalier | |
| 11,377,881 | B2 | 7/2022 | Bartola et al. | |
| 2012/0091740 | A1 * | 4/2012 | Chevalier | E05B 81/20 292/226 |
| 2012/0161453 | A1 * | 6/2012 | Zysk | E05B 83/26 292/21 |
| 2012/0161456 | A1 | 6/2012 | Riedmayr et al. | |
| 2014/0210220 | A1 * | 7/2014 | Limberg | E05B 83/24 292/216 |
| 2015/0102607 | A1 * | 4/2015 | Kim | E05B 77/54 292/92 |
| 2018/0030763 | A1 | 2/2018 | Distefano et al. | |
| 2019/0055758 | A1 | 2/2019 | Chevalier | |
| 2020/0031840 | A1 | 1/2020 | Hudkins et al. | |
| 2022/0098905 | A1 | 3/2022 | Chevalier | |

FOREIGN PATENT DOCUMENTS

| | | | | |
|---|---|---|---|---|
| CN | 102345420 | | 6/2014 | |
| CN | 102806946 | | 6/2016 | |
| CN | 102765426 | | 4/2017 | |
| DE | 19629361 | | 7/1996 | |
| DE | 19916191 | | 10/2000 | |
| DE | 19916191 | A1 * | 10/2000 | E05B 81/20 |
| DE | 102014222269 | | 5/2016 | |
| EP | 0819471 | | 1/1998 | |
| WO | WO 2010/067074 | | 6/2010 | |
| WO | WO 2013/087454 | | 6/2013 | |
| WO | WO-2013087454 | A1 * | 6/2013 | E05B 77/54 |
| WO | WO 2015/139678 | | 9/2015 | |
| WO | WO 2017/174980 | | 10/2017 | |

* cited by examiner

LATCHING SYSTEMS FOR LATCHING MOVABLE PANELS

CROSS-REFERENCE TO RELATED APPLICATIONS

This application is a continuation of U.S. patent application Ser. No. 17/643,284 filed Dec. 8, 2021, which is a continuation of U.S. patent application Ser. No. 16/089,659 filed Sep. 28, 2018, now U.S. Pat. No. 11,220,848, which is a U.S. national application filed under 35 U.S.C. 371 to PCT International Application No. PCT/GB2017/050946 filed Apr. 5, 2017, which claims benefit of priority to British Patent Application No. 1606039.4, filed on Apr. 8, 2016, the content of each of which is incorporated herein by reference in its entirety.

BRIEF SUMMARY OF THE INVENTION

The present invention relates to a latching system for latching a movable panel such as an automotive movable panel. The invention also relates to automotive front panel systems for automobiles, and to automobiles including such systems.

A known latching system for latching a movable automotive panel is used for an openable front trunk lid of an automobile. The system includes a striker mounted on the trunk lid and a first catch for holding the trunk lid closed. A second catch is provided for engagement with the striker in a slightly opened position of the trunk lid. Thus, when the trunk lid is closed and the user wishes to open the trunk lid, the first catch is opened and the striker moves together with the trunk lid, the striker being caught by the second catch. The user can then take a second action to release the second catch in order to fully open the trunk lid. The second catch is provided as a safety feature to limit the possibilities of the trunk lid opening up and potentially blocking the view through the front windscreen when the automobile is in motion, such as may happen when the trunk lid release is inadvertently operated during vehicle motion or may happen during a vehicle crash when the forces involved may release the striker from the first catch. Secondly, the second catch provides a second latch position of the trunk lid in which the driver will be likely to note that the trunk lid is not fully closed yet the trunk lid is relatively safe. The second catch comprises a hooked element with its rest position in the path of movement of the striker and upon closing the trunk lid the striker hits the second catch, pushes it to the side with a camming action and then the second catch by virtue of a spring catches behind the striker such that the striker will always engage the second catch when the trunk lid is being opened. This means that the closing action and opening action are both noisy due to the engagements between the striker and the second catch. Furthermore, the user is required to push down on or slam the trunk lid in order to fully close it and engage the first catch with the striker. Also, it is necessary to use two motors in order to operate the first and second catches and this is expensive and takes up significant packaging space.

The present invention aims to alleviate at least to a certain extent at least one of the problems of the prior art. Alternatively, the invention aims to provide a useful latching system for movable panels such as automotive movable panels.

According to the present invention there is provided a latching system for latching a movable panel such as an automotive movable panel, the system having a striker movable relative to first and second catches which are adapted to cooperate with the striker to limit relative movement therebetween, characterised in that a single motor is provided to transmit drive through the latching system to drive both of the catches to positions in which movement of the striker is restricted by the catches. An advantage of this arrangement is a significant saving in cost and in packaging space.

Preferably, the motor is arranged to move the striker to and lock the striker in a primary latched position of the movable front panel. When the movable panel is a front lid such as a trunk lid or engage hood of an automobile, the user is able to gently lower the panel down to a position in which the motor is therefore advantageously able to move the striker to and lock the striker in a primary latched position or fully closed position of the movable front panel. The user therefore does not have to slam the panel or push down hard on it in order to achieve full closure of the panel.

According to a further aspect of the present invention there is provided an automotive front panel system for an automobile, such as for an openable front trunk lid or engine hood of an automobile, the system including bodywork and an openable front panel in front of any occupant space of the automobile and/or in front of a windscreen of the automobile, the system having a striker mounted on one of the openable front panel or the bodywork and a first catch mounted on the other of the openable front panel and the bodywork, characterised in that a motor is provided for driving the first catch to move the striker to and lock the striker in a primary latched position of the openable front panel relative to the bodywork. Again, this has the substantial advantage that the user does not need to slam, drop or push down hard on the panel but can gently lower it and the motor can then with a clinch action move the panel to the primary latched position of the striker in which the panel is fully closed.

Preferably, the latching system includes a second catch for limiting movement of the striker. The second catch may advantageously be positioned for catching on the striker when the first catch is released and it is desired to hold the striker and the associated panel in a slightly open position. This may thus enable the panel to be held in a slightly open position for example after a crash and the present inventor has also noted that when the panel is for a front trunk, if someone is trapped inside the trunk, this slightly open position in which the second catch is limiting movement of the striker allows air into the trunk so that the trapped person can breathe.

Preferably, the motor is adapted to drive the first catch to move the striker from a secondary latched position to the primary latched position, the striker being between a fully open position thereof and the primary latched position when in the secondary latched position. Thus, when a user wishes to close the panel/lid, the panel may be moved through the efforts of the user to a position in which the striker engages the first catch in the second latched position and the motor then takes over with a clinch action and smoothly moves the panel and striker such that the striker is in the primary latched position and the panel is fully closed.

Preferably, a controller is provided for causing movement of the second catch to a latch position in which it is arranged to limit movement of the striker.

According to a further aspect of the present invention there is provided a latching system for latching an automotive movable panel, the system having a striker movable relative to first and second catches which are adapted to cooperate with the striker to limit movement of the striker relative to a main body of the system on which the catches are mounted, characterised in that a controller is provided for causing movement of the second catch to a latch position in which it is arranged to limit movement of the striker.

Preferably, the controller is adapted to process a signal based upon automotive speed and is adapted to cause movement of the second catch to the latch position when the signal is based upon any automotive speed above a predetermined threshold, for example 3 to 10 kph, or about 5 kph.

Preferably, the latching system includes a device, such as a bias or spring, for moving the second catch to a rest position thereof out of the way of movement of the striker.

Advantageously, rather than the second catch being held in the path of movement of the striker as in the prior art, the controller may therefore be used to move the second catch to the latch position where it limits movement of the striker. The second catch therefore does not need to be in the way of the striker and always hit the striker during closing and opening of the panel. Advantageously, with the controller processing a signal based on automotive speed and being adapted to cause movement of the second catch when the signal is based on an automotive speed such as about 5 kph, the second catch can be kept in a rest position thereof while the automobile is not being used and, indeed, in normal operation, never needs to engage the striker. In some preferred embodiments, the second catch will only need to engage the striker if there is a problem with the first catch, such as during a crash while the vehicle is in motion, or if there is a panel open command request while the vehicle is in motion, such as accidentally or if issued by a person trapped inside a front trunk of the vehicle in a case in which the panel is a front trunk lid.

With the device such as a bias or spring provided for moving the second catch to a rest position out of the way of movement of the striker, the second catch may therefore never engage the striker unless required as outlined above. This provides a good improvement in noise, control and an overall feeling of high quality.

Preferably, a controller is provided which is adapted to receive a signal representative of zero vehicle speed and a signal representative of a panel open request to cause the second catch to be moved to the rest position. Thus, with the second catch in its latch position, which may be adopted while the automobile is in normal motion, the controller may advantageously enable the device such as a bias or spring to move the second catch to its rest position out of the way of the striker when the vehicle is stationary and a panel open request is made by the user.

Preferably, the motor is adapted to rotate a motor cam to drive a cam follower of an actuation member rotatably mounted on a body of the latching system.

Preferably, the first catch is provided in the form of a claw having a jaw which is adapted to be engaged by the striker for rotation of the claw about a claw pivot.

Preferably, one of the claw and a pawl member has a first lock surface and the other of the claw and pawl member has at least one further lock surface adapted to lockingly engage said first lock surface.

Preferably, a pawl lock surface of the pawl member and the at least one further lock surface comprises two locking notches of the claw which are selectively engageable by the pawl lock surface.

Preferably, the pawl lock surface and locking notches are arranged to engage one another in at least one latched position of the claw and a bias such as a spring is provided for moving the claw from said latched position to an open position thereof.

Preferably, a bias such as a spring is provided for biasing the pawl lock surface towards a cooperating surface of the claw.

Preferably, the second catch comprises a movable member such as a rotatable lever adapted to rotate about a pivot.

Preferably, the second catch has a hook at one end thereof which in a latch position thereof is arranged to catch the striker during movement of the striker.

Preferably, the hook has a hook surface which extends substantially arcuately and tangentially relative to a pivot of the second catch, the hook surface preferably being substantially on an arc centred on such pivot. Therefore, pulling forces applied to the hook by the striker do not tend to cause the striker to pull off the end of the hook but the striker is held in place on the hook by such pulling forces.

Preferably, the second catch, the pivot for the second catch and the striker are arranged such that, upon the striker pulling the hook in a pull direction, the hook surface is on the striker side of an imaginary plane passing through the pivot of the second catch and parallel to the pull direction. Advantageously, therefore, when significance forces are applied to the second catch by the hook in the pull direction such as may happen in a vehicle crash when the first catch has released the striker due to large forces applicable in a crash, and when the components of the latching system such as the hook and the striker as well as the lid or panel to which the striker is mounted may be liable to flexing or bending, this configuration advantageously results in such bending or flexing causing the pulling force of the striker being brought more into line with a pivot of the second catch such that the moment of torque provided about the pivot by the pulling of the striker is likely to reduce as this flexing or bending occurs, with the result that further flexing or bending is likely to be reduced.

Preferably, the actuation member has a second catch cam which is adapted to engage a cam follower of the second catch to move the second catch to a latch position thereof.

Preferably, the second catch cam and cam follower of the second catch are provided with cooperating surfaces which face one another, a plane through normal to said cooperating surfaces passing through or substantially through a centre of rotation of the actuation member when the second catch is locked in the latch position by the engagement of the second catch cam and cam follower; the cooperating surfaces optionally being circular arc portions with their centre at the centre of rotation of the actuation member. Advantageously, therefore, when the striker pulls on the second catch, the reaction against this pulling is by engagement of the cooperating surfaces against one another and there is highly advantageously no tendency of the actuation member to rotate due to the force applied to it from the second catch via the cam follower of the second catch and the second catch cam mounted on the actuation member.

Preferably, the second catch cam is fixed to a shaft extending from a main body part of the actuation member.

Preferably, the latching system includes a driver, preferably in the form of a roller, the driver being mounted on the shaft between the main body part and the second catch cam.

Preferably, the driver is adapted to drive the first catch from the secondary latched position to the primary latched position.

Preferably, the driver is also adapted to drive the pawl member away from the first catch in order to permit the first catch to rotate to an unlatched position in which the striker may move away from the first catch. Advantageously, therefore, the same driver may operate both of the pawl member and the first catch. Also, the same actuation member on which the driver is mounted also operates the second catch via the second catch cam and so only one actuation member is needed for operating all of the first catch, second catch and pawl member. In turn, only one motor is required for operating the actuation member which operates all three of the pawl member, first catch and second catch.

Preferably, the latching system includes a manual release for releasing the striker. This can be employed, for example, by a service technician, for opening the first and second catches and allowing the panel/lid to be opened in a service situation, for example when vehicle ignition or battery power for the motor are disconnected, malfunctioning or switched off.

Accordingly to a further aspect of the present invention there is provided a latching system for latching a movable panel such as an automotive panel, the system having a striker movable relative to first and second catches which are adapted to cooperate with the striker to limit relative movement of the striker relative to a main body of the system on which the catches are mounted, characterised in that at least one position sensor is provided for reporting a position of the first catch to a controller whereby the state of positions of the first and second catches is detectable. Advantageously, the controller may be mounted on a printed circuit board which is part of the latching system which may detect all states of the first and second catches for reporting to the rest of the automobile such as through CAN-Bus or other communication protocol.

Preferably, at least one said position sensor is mounted to sense the position of a magnet on the first catch. In this case, the printed circuit board may include at least one hall effect sensor to detect the position and/or direction of movement of the first catch relative to a main body of the latching system.

Preferably, a motor is provided for moving an actuation arm which is adapted to move the first and second catches, and in which a motor sensor is provided for sensing a rotational position of the motor and reporting this position to the controller, the controller being adapted to establish a state of the second catch at least partly from position data provided by the motor sensor. The motor sensor may also be mounted together with the motor as part of the printed circuit board such that the latching system may conveniently itself be able to calculate and process the positions of both the motor and thus an actuation member driven by the motor and the first catch and from this information, the positions of all of the components of the latching system may be determined and controlled.

According to a further aspect of the present invention, there is provided an automobile which includes a system as set out in any previous aspect hereof.

BRIEF DESCRIPTION OF THE SEVERAL VIEWS OF THE DRAWINGS

The present invention may be carried out in various ways and one embodiment of a latching system for a movable automotive panel will now be described by way of example only and with reference to the accompanying drawings, in which.

DETAILED DESCRIPTION OF THE INVENTION

Figure 8:
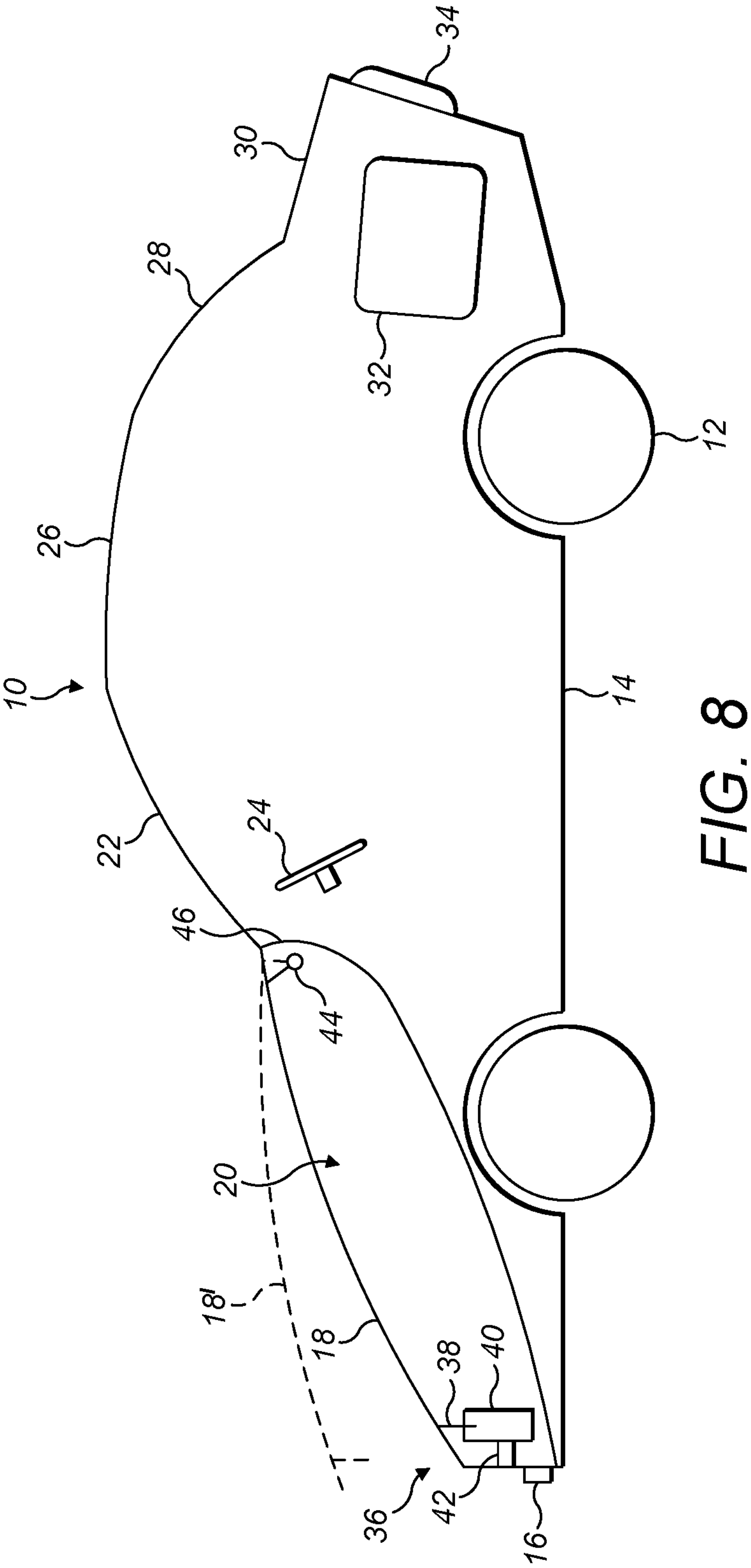
FIG. 8 schematically shows the latching system mounted in an automobile.

As shown schematically in FIG. 8, an automobile 10 with wheels 12 and a body 14 has front lights 16, a front trunk lid 18 above a front trunk 20 for storing luggage, a front windscreen 22, a front occupant steering position 24, a roof 26, a rear windscreen 28, a rear hood 30 above an internal combustion, hybrid or electrical or other drive system 32 and rear lights 34.

A latching system 36 is provided in or near the front trunk 20 and has a striker 38 mounted to the front trunk lid 18 and a catch system 40 mounted to the body 14 on mounting brackets 42.

The front trunk lid 18 is openable as will be described below from the closed position shown in solid lines in FIG. 8 to various open positions one of which is shown in dashed lines in FIG. 8 with the front trunk lid marked 18'. The opening and closing motion/path of the front trunk lid 18 is defined by a hinge, four bar link or other system 44 located towards a rear 46 of the front trunk 20.

Figure 1:
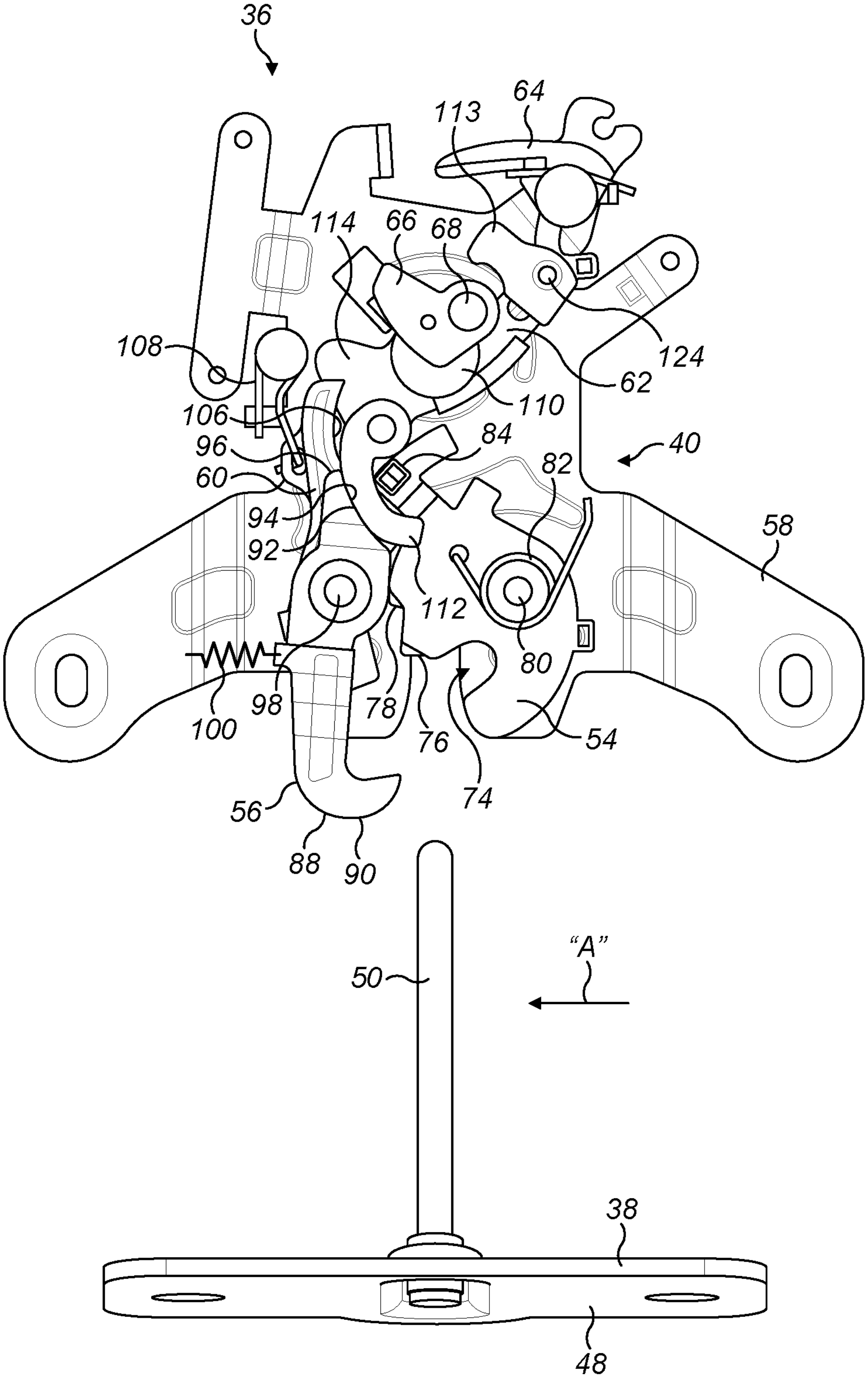
FIG. 1 is a schematic view of part of a preferred embodiment of a latching system in accordance with the present invention with the components thereof in an open configuration.
Figure 11:
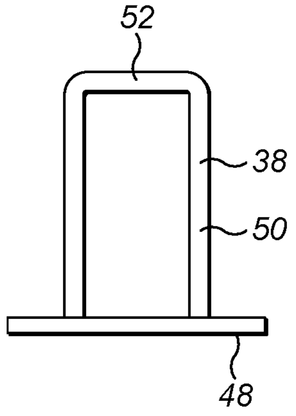
FIG. 11 schematically shows a view of the striker when shown looking along the direction A in FIG. 1.

With reference to FIGS. 1 and 11, the striker 38 has a mounting flange 48 and a U-shaped body 50 having a cross bar 52 which is adapted to engage with first 54 and second 56 catches of the catch system 40.

With reference to FIG. 1, the catch system 40 has a main body 58 for mounting the catch system 40 to the mounting brackets 42 using conventional fasteners (not shown).

As well as having the first catch 54 and second catch 56, the catch system 40 includes a pawl lever or member 60, an actuation member 62, a manual release cam 64 and a motor drive cam 66 whose drive shaft 68 is driven by a motor 70 (see FIG. 9) which is mounted on a PCB/controller 72 which is fastened to the main body 58 of the catch system 40 by conventional fasteners (not shown).

The first catch 54 is formed as a claw with a mouth 74, a primary locking surface 76 and a secondary locking surface 78. The first catch 54 is mounted on the main body 58 for rotation about a first catch pivot 80 and is provided with a first catch spring 82 which is adapted to bias the first catch 54 anticlockwise as shown in FIG. 1 to an open position thereof which is indeed the position shown in FIG. 1. The first catch 54 is also provided with two magnets 84 of opposite polarity poles which are sensed by Hall effect sensors 86 mounted on the PCB/controller 72 such that the PCB/controller 72 is able to determine the position of the first catch 54 from the opposite direction magnets 84 passing the sensors 86.

The second catch 56 is in the form of a lever with a hook 88 at one end 90 thereof and a second catch cam follower 92 having a second catch cam follower surface 94 at an opposite end 96 thereof. The second catch is mounted by a second catch pivot 98 to the main body 58 for rotation about the second catch pivot 98 and has a second catch return spring 100 which is shown schematically in FIG. 1 and is omitted from other figures for the purposes of clarity. The second catch return spring 100 biases the second catch 56 to a rest position thereof, which is the position shown in FIG. 1, in which the second catch 56 does not engage the cross bar 52 of the striker 38 as the striker cross bar 52 moves past the second catch 56 as the trunk lid 18 is closed and opened. As shown in FIG. 1, the second catch 56 is biased clockwise by the second catch return spring 100.

The pawl member 60 is positioned between the second catch 56 and the main body 58 of the catch system 40 and, like the second catch 56, is mounted for pivotal rotation about the second catch pivot 98. The pawl member 60 has a pawl formation 102 (see FIG. 2) with a pawl surface 104 and has a pawl cam follower 106. A pawl bias spring 108 is adapted to biasingly pivot the pawl member 60 towards the first catch 54 so that the pawl formation 102 may selectively engage with either of the primary locking surface 76 and secondary locking surface 78 of the first catch 54. Therefore, as shown in FIG. 1, the pawl spring 108 biases the pawl member 60 clockwise, the same rotational direction in which the second catch 56 is biased by its spring 100 but the opposite rotational direction to that in which the first catch 54 is biased by its spring 82.

The actuation member 62 is mounted for pivotal rotation relative to the main body 58 by a pivot 110 and includes a cam follower or input cam 113 arranged to be driven by the motor drive cam 66, as well as an output cam 112 which is arranged to engage the second catch cam follower surface 94 of the second catch 56.

Figure 10:
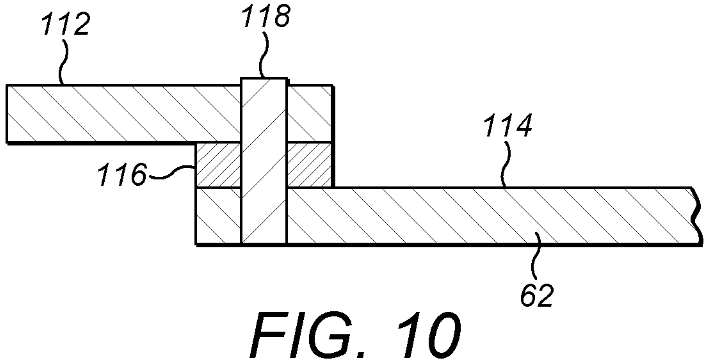
FIG. 10 shows, schematically, a cross-section through part of an actuation member of the latching system.

As shown by the schematic cross-section in FIG. 10, the output cam 112 is spaced from a main plate 114 of the actuation member 62 by a driver in the form of a roller 116, the output cam 112 being fixedly mounted to the main plate 114 by a shaft 118 and the roller 116 being not only positioned between the output cam 112 and the main plate 114 but also rotatable about the shaft 118. The roller 116 is adapted to drive both the pawl member 60 by pushing on the pawl cam follower 106 and the first catch 54 by pushing on a drive surface 120 (FIG. 2) of the first catch 54 and the roller may also engage against an arcuate stop surface 122 of the first catch 54, the arcuate stop surface 122 being an arc centred on the first catch pivot 80.

It will therefore be appreciated that the main plate 114 as shown in FIG. 1 is positioned behind the pawl member 60 and the first catch 54, the roller 116, pawl member 60 and first catch 54 are higher and generally aligned with one another in the direction in and out of the page, and the output cam 112 and second catch 56 are above those components yet able to engage one another being generally in the same plane as one another in the direction in and out of the page. Furthermore, the motor drive cam 66 and the input cam 113 of the actuation member 62 are arranged to engage one another and are generally in a plane similar to or slightly above the output cam 112 and second catch cam follower 92, the input cam 113 being mounted fixedly to the main plate 114 of the actuation member 62 by a shaft 124 to space the input cam 113 from the main plate 114.

As shown in FIG. 1, the latching system 36 is in a position in which the front trunk lid 18 is open.

Figure 2:
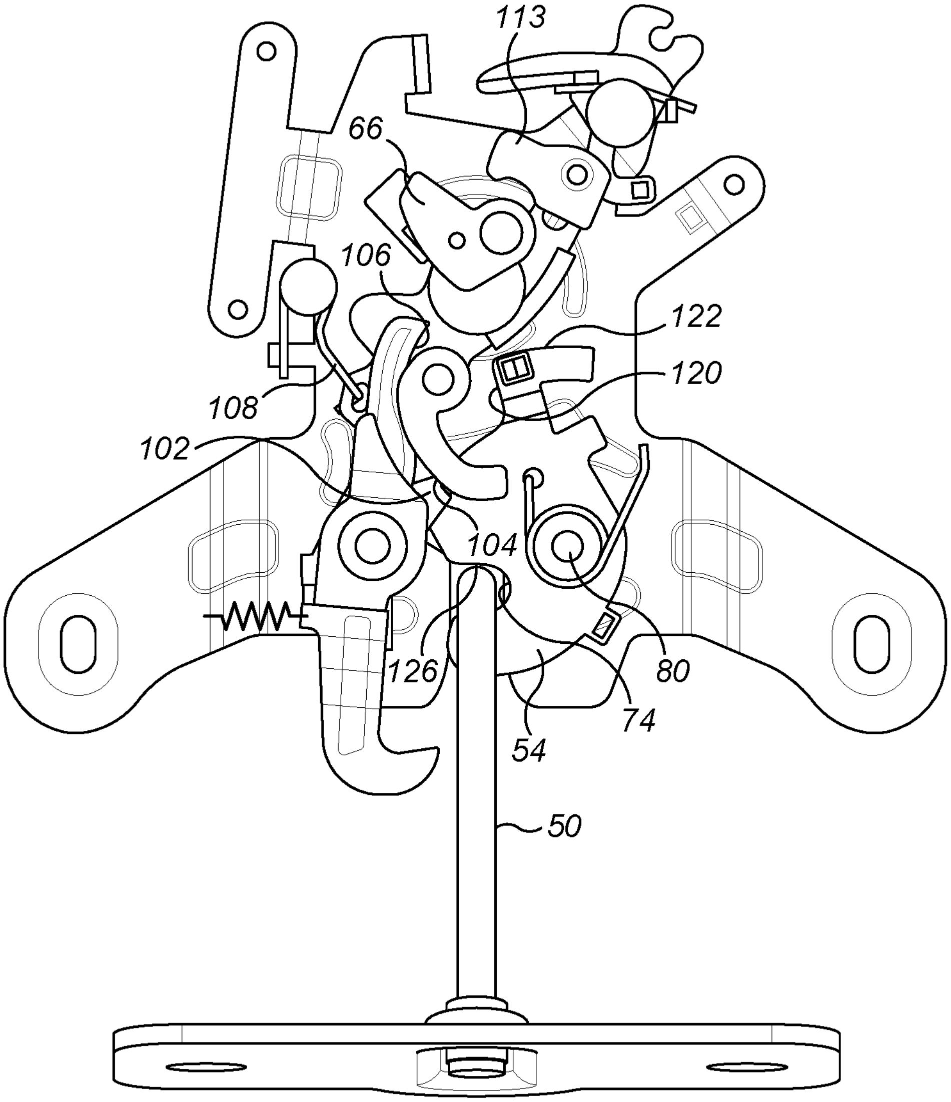
FIG. 2 shows the parts of FIG. 1 with a striker thereof having engaged a first catch thereof and having pushed the first catch so that the system is in a secondary latched configuration thereof.
Figure 3:
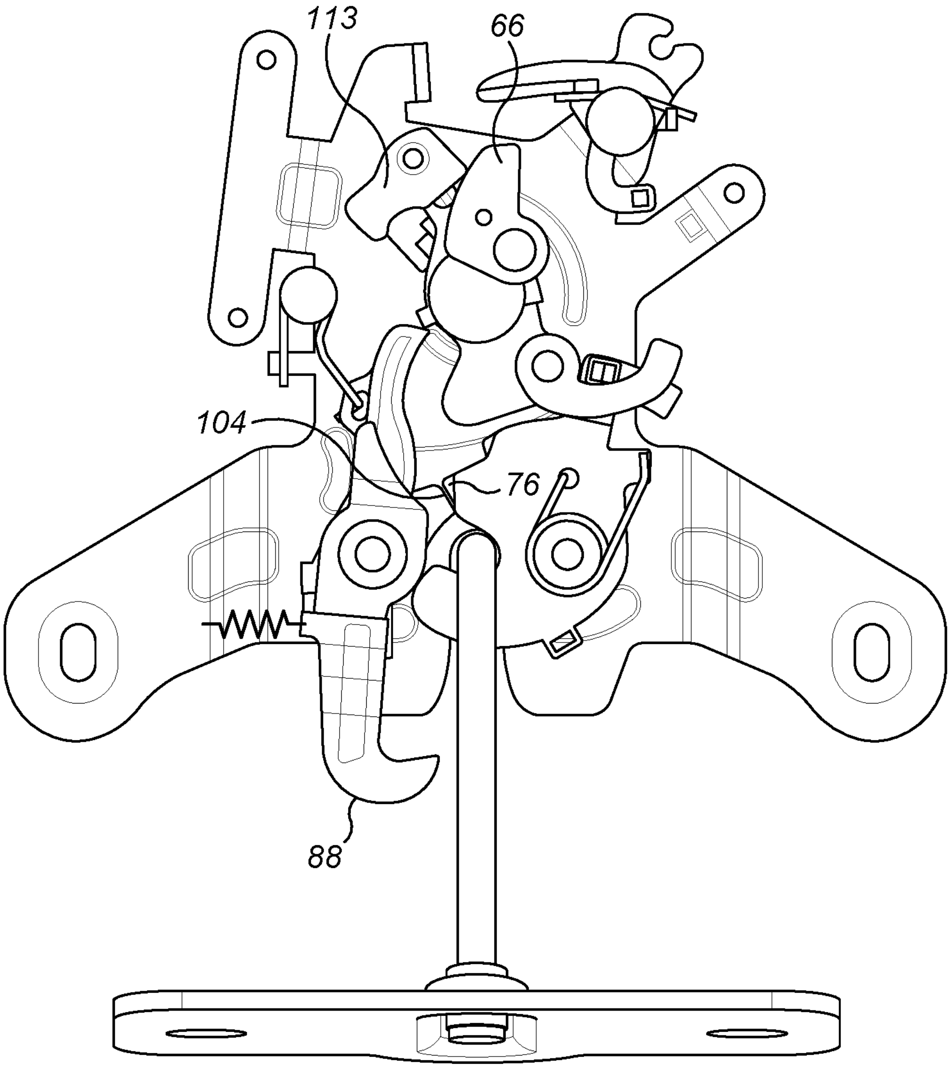
FIG. 3 shows the components of FIG. 2 in which a motor has driven the first catch to pull the striker to a position in which the first catch is overdriven 3° past a primary latched configuration of the system.
Figure 4:
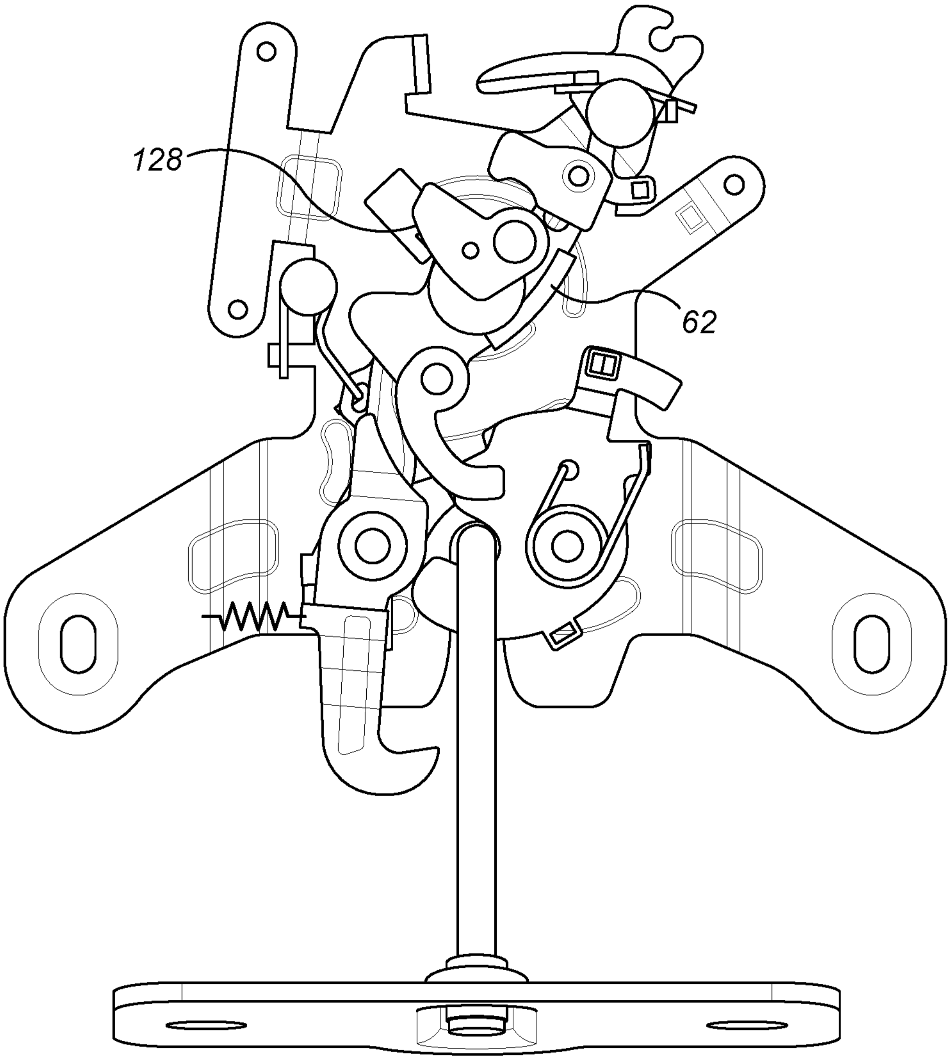
FIG. 4 shows the components of FIG. 3 but with the first catch relaxed 3° such that the latching system is in a primary latched configuration thereof.

As the user lowers the front trunk lid, the crossbar 52 of the striker 38 engages on an entry surface 126 (FIG. 2) of the mouth 74 of the first catch/claw 54 and rotationally pushes the first catch 54 to the position thereof shown in FIG. 2 in which the latching system 36 is considered to be in a secondary latched configuration thereof. In this position, the pawl surface 104 of the pawl formation 102 engages in the secondary locking surface 78 of the first catch 54 so that the trunk lid will not bounce further open and the striker 38 is caught by the first catch 54. Furthermore, the position of the magnets 84 on the first catch 54 is sensed by the sensors 86 of the PCB/controller 72 and the controller 72 then controls the motor 70 to rotate the motor drive cam 66 (anticlockwise from the position shown in FIG. 2) so as to drive the input cam 113 to the position shown in FIG. 3 in which the pawl surface 104 is against the primary locking surface 76 of the first catch 54. In this configuration shown in FIG. 3, the actuation member 62 has been driven 68° round from the position thereof shown in FIG. 2 and the first catch 54 has been overdriven 3° past what is its position when it is in a position when the latching system 36 is in a primary latched configuration as shown in FIG. 4. Thus, once the overdriven position shown in FIG. 3 has been achieved, the motor rotates the motor drive cam 66 back to its original position shown in FIGS. 1 and 2 and the first catch 54 relaxes 3° and by a double-acting return spring 128 thereof, which is only partially shown in FIG. 4, the actuation member 62 is brought back substantially to its original configuration of FIG. 2. The 3° overdrive position ensures good latching of the first catch 54. Thus, in the configuration of FIG. 4, the latching system 36 is in a primary latched configuration thereof in which the front trunk lid 18 has been fully closed and the automobile 10 is ready to drive off. It will be noted that the pawl surface 104 is substantially on an arc centred on the second catch pivot 98 and the primary 76 and secondary 78 locking surfaces also are when they are in their respective engaged positions with the pawl surface 104. Therefore, pulling on the first catch 54 by the striker 38 does not tend to result in a component of rotation of the pawl member 60.

It is also noted that if the user should slam the trunk lid 18 from the open configuration of FIG. 1, the latching system 36 can move straight from the configuration of FIG. 1 or indeed from the configuration of FIG. 2 to the configuration of FIG. 4. It is noted that the actuation member 62 takes up a slightly different configuration in FIG. 1 to that shown in both of FIGS. 2 and 4. This is because in FIG. 1 the roller 116 is riding on the arcuate stop surface 122 and when the roller 116 falls off the end of the arcuate stop surface 112 as the first catch 54 rotates to the configuration thereof shown in FIG. 2 the double-acting return spring 128 rotates the actuation member 62 slightly to a rest or neutral position thereof which is the position shown in FIGS. 2 and 4.

Figure 5:
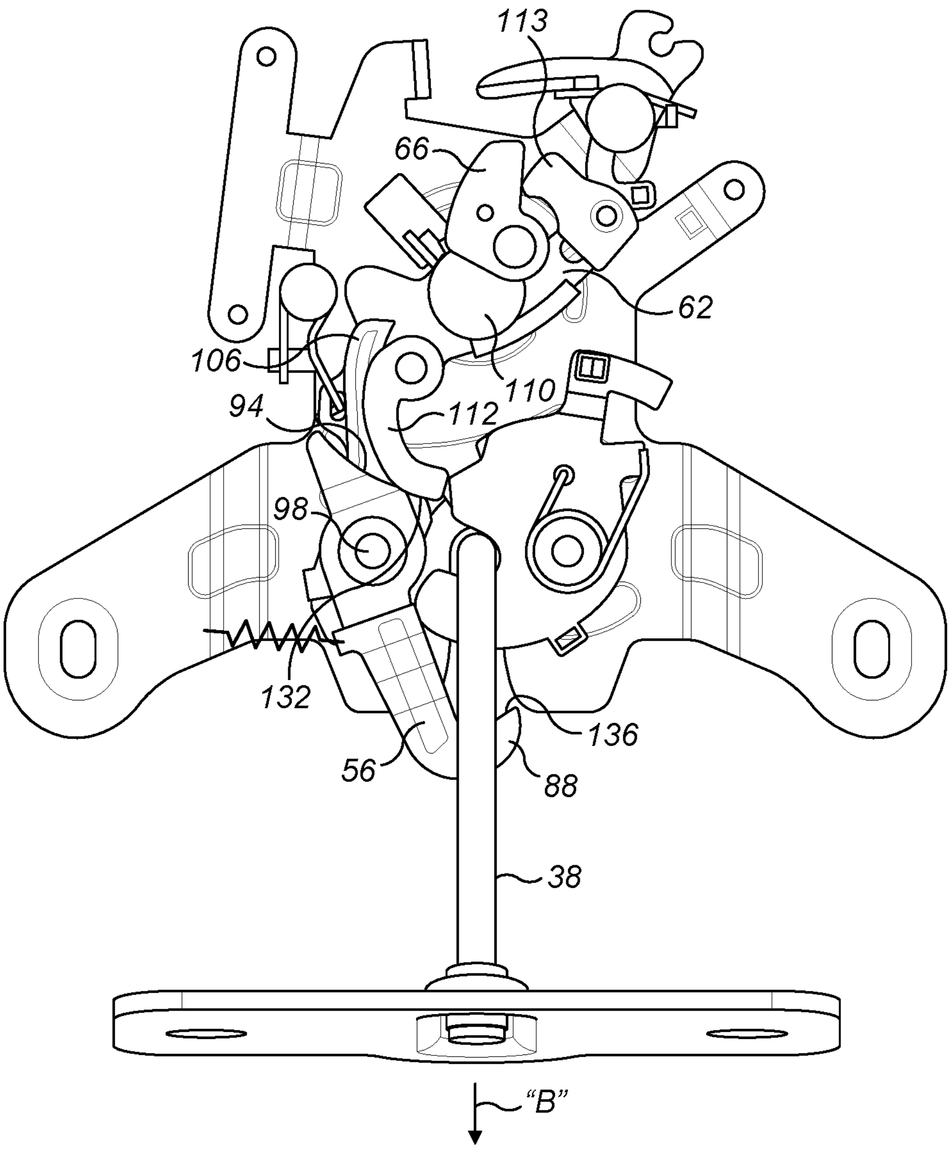
FIG. 5 shows the components of the latching system in which a secondary catch has been moved to a latch position thereof so that the system takes up a tertiary latched configuration thereof.

So, with the latching system 36 in the primary latched configuration shown in FIG. 4, the position of the first catch 54 is detected by cooperation of the magnets 84 and the sensors 86. When the vehicle then sets off from rest with the latching system 36 in the primary locked configuration shown in FIG. 4, and when the speed of the automobile 10 builds up above a predetermined level, such as about 3 to 10 kph, or 5 kph in one example, the sensor 130 sends a signal representative of this speed to the PCB/controller 72 and the motor 70 is commanded to rotate the motor drive cam 66 to engage the input cam 113 (i.e. clockwise motion of the motor drive cam 66 as shown in FIG. 5) and the actuation member is rotated sufficiently that the output cam 112 engages the second catch cam follower surface 94 and, indeed, an output cam camming surface 132 comes into engagement with the second catch cam follower surface. Both of the output cam camming surface 132 and the second catch cam follower surface 94 are in this configuration shown in FIG. 5 located on the same arc in space which has its centre as the centre of the pivot 110 of the actuation member 62. During this engagement, the second catch 56 is rotated 25° to its position shown in FIG. 5 in which the latching system has adopted a tertiary latched configuration thereof. Due to the output cam camming surface 32 and the second catch cam follower surface 94 being positioned as curved surfaces with their centres at the centre of the pivot 110, a force applied to the second catch 56 by the striker 38 will have no resulting component of force acting to attempt to rotate the actuation member 62. Thus, the second catch 56 is very securely positioned. Nevertheless, the motor drive cam 66 may remain in its position shown in FIG. 5 in which it engages the input cam 113 of the actuation member 62 to block rotation of the output cam 112.

With the automobile 10 driving along normally, the latching system 36 is kept in the tertiary latched configuration shown in FIG. 5.

If the automobile 10 is subjected to a crash such as a frontal impact in which the first catch 54 is overpowered, the second catch 56 is nevertheless positioned to catch on the crossbar 52 of the striker 38 in order to stop further opening of the front trunk lid 18 and in particular to stop the trunk lid 18 from rising up so far that it blocks the view ahead through the windscreen 22. Furthermore, the hook 88 of the second catch 56 has a radiused surface 136 forming an arc concentric around the second catch pivot 98 such that the crossbar 52 does not tend to slide off the hook 88. Additionally, compared to a direction of pull marked B of the striker 38 as shown in FIG. 5, the hook 88 is on the striker side of a parallel plane passing through the second catch pivot 98. This means that with a strong pull in the direction B of the striker 38 on the hook 88, resultant flexing or bending of the components is likely to be such that the plane of pull of the crossbar 52 of the striker 38 on the hook 88 is likely to be brought closer to the parallel plane passing through the second catch pivot 98 such that as this happens under significant loads the turning moment around the second catch pivot 98 due to these loads is likely to reduce such that the striker 38 is likely to remain securely engaged and caught by the second catch 56 even under very significant loads which may be applied during a vehicle crash such as a significant frontal impact. The configuration of the arcuate second catch cam follower surface 94 and the output member camming surface 132 as arcs centred on the centre of the actuation member pivot 110 also assists in very securely jamming the second catch 56 against rotation as described above, whereby it is extremely difficult for significant loads applied by the striker 38 to overcome the second catch 56.

Figure 6:
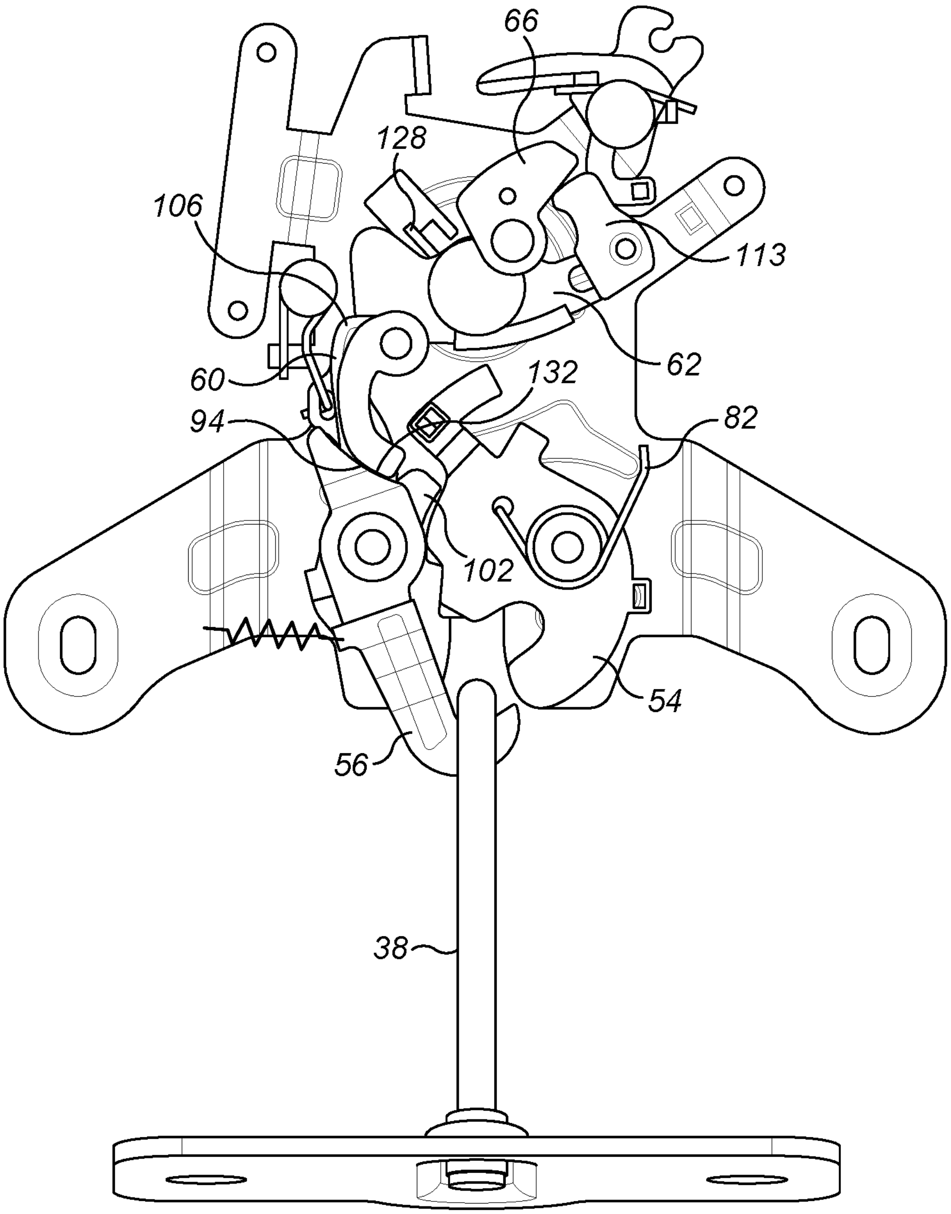
FIG. 6 shows the components of the latching system in a configuration in which a release request has been issued while an automobile to which the components are fitted is in motion.

If the vehicle is driving along with the latching system 36 in the tertiary latched configuration shown in FIG. 5 and a release request should be issued, for example either by accident from an interior release request button 138 or by actuation of a luminous release request button 140 associated with the latching system 36 and located inside the front trunk 20, such latter request for example being issued by a child or other passenger accidentally located inside the front trunk 20, the latching system 36 is changed from the configuration of FIG. 5 to the configuration shown in FIG. 6. Alternatively, release button 138 may be inhibited from causing any release while the automobile 10 is in motion but button 140 located inside trunk 20 may achieve this.

To achieve this, the motor 70 drives the motor drive cam 66 so as to push on the input cam 113 and rotate the actuation member 62 so that firstly the pawl member 60, and in particular its pawl surface 102, disengages from the first catch 54 and the first catch spring 82 rotates the first catch 54 so that the striker 38 is fully released from the first catch 54. Furthermore, the output member camming surface 132 rides further along the second catch cam follower surface 94 and the second catch 56 is maintained in a position in which it is to be engaged by the crossbar 52 of the striker 38 as shown in FIG. 6. In this configuration, and in this particular embodiment, the striker and adjacent area of the front lid trunk 18 has been allowed about 26 millimetres of travel from its position in the primary latched configuration of the latching system 36. Therefore, the trunk lid 18 is able to rise up slightly, thereby providing a source of air for anyone who needs to breath and is trapped inside the front trunk 20. Furthermore, the somewhat ajar or raised configuration of the front trunk lid 18 may be easily visible from within the automobile 10 such that an easy warning may be provided to the users of the automobile 10. Also, the magnets 84 and sensors 86 may cooperate to provide an electronic warning signal to warning system 142 located in the automobile 10.

It will be noted that in FIG. 5, the roller 116 has slightly pushed up on the pawl cam follower 106 but not enough to disengage the pawl surface 104 from the primary locking surface 76 and by the configuration of FIG. 6 the roller 116 has pushed further on the pawl cam follower 106 to cause additional rotation of the pawl member 60 in order to release the first catch 54.

Figure 7:
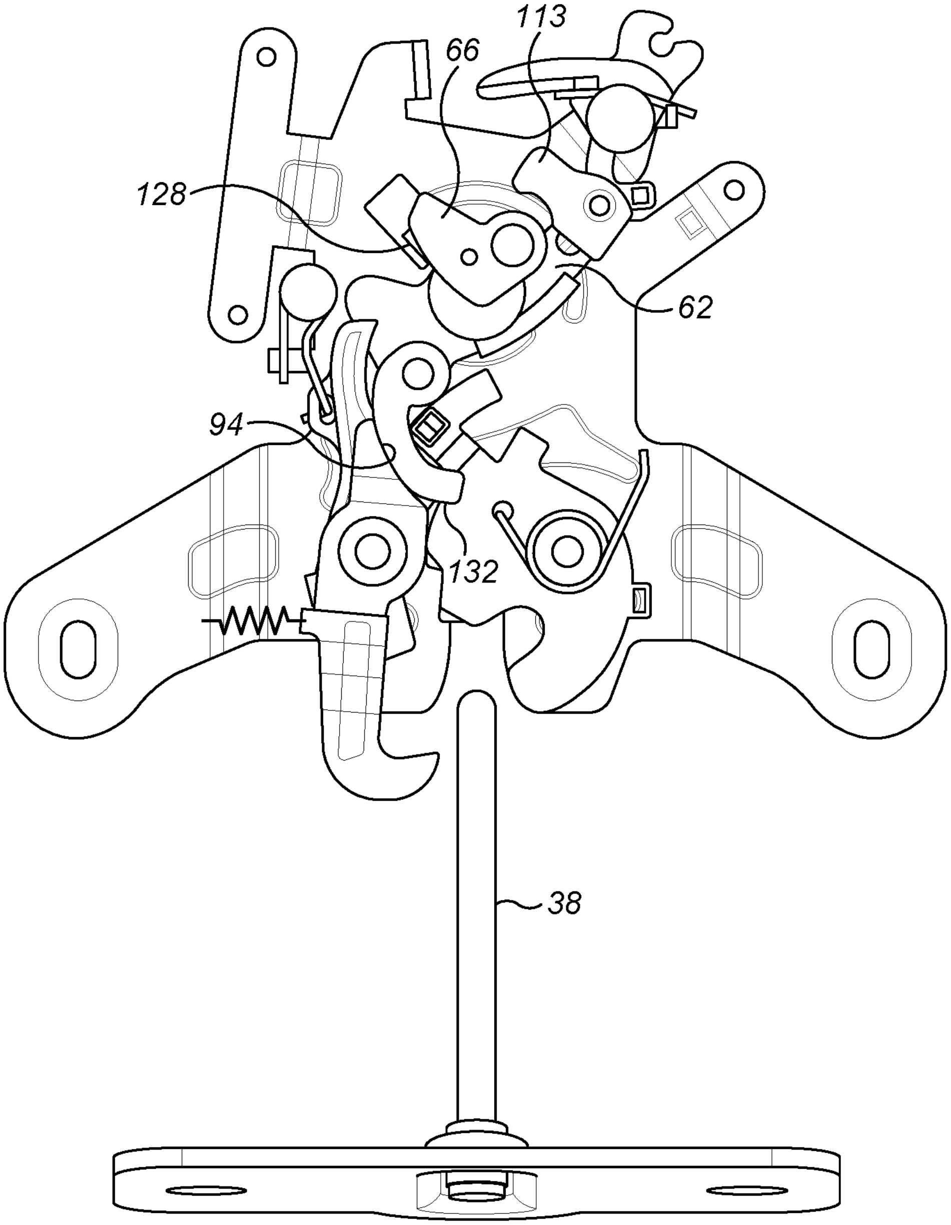
FIG. 7 shows the components of the latching system in a configuration in which a release request has been issued with the vehicle stationary and, in fact, the components of the latching system are in substantially the same configuration as the way they are shown in FIG. 1.

Once the automobile 10 is stationary, and once a release request is initiated with the vehicle stationary, either by using the release button 138 or the release button 140, the motor 70 drives the motor drive cam 66 away from the input cam 113 (anticlockwise as shown in FIGS. 6 and 7) to the configuration of the motor drive cam shown in FIG. 7. This allows the double-acting return spring 128 for the actuation member 62 to rotate the actuation member to its configuration shown in FIG. 7 which is in fact the same configuration as shown in FIG. 1 and, in doing so, the output member camming surface 32 disengages from the second catch cam follower surface 94, allowing the return spring 100 (see FIG. 1) for the second catch 56 to rotate the second catch 56 back about 25° to its rest position in which it no longer interferes with the movement of the striker 38. Thus, the striker 38 is no longer caught and the front trunk lid 18 can be opened.

Furthermore, if the automobile 10 is driven along in the tertiary latched configuration shown in FIG. 5 and then comes to a stop and a release request is issued at either the release button 138 or the release button 140, the motor 70 is commanded to rotate the motor drive cam 66 directly from its configuration shown in FIG. 5 to that shown in FIG. 7 via the configuration shown in FIG. 6 so that the first catch 54 is released and the second catch 56 is virtually immediately also brought back to its rest position so that the striker 38 can be removed and the front trunk lid 18 opened straight away without the striker 38 ever engaging the second catch 56 during this opening sequence.

Figure 9:
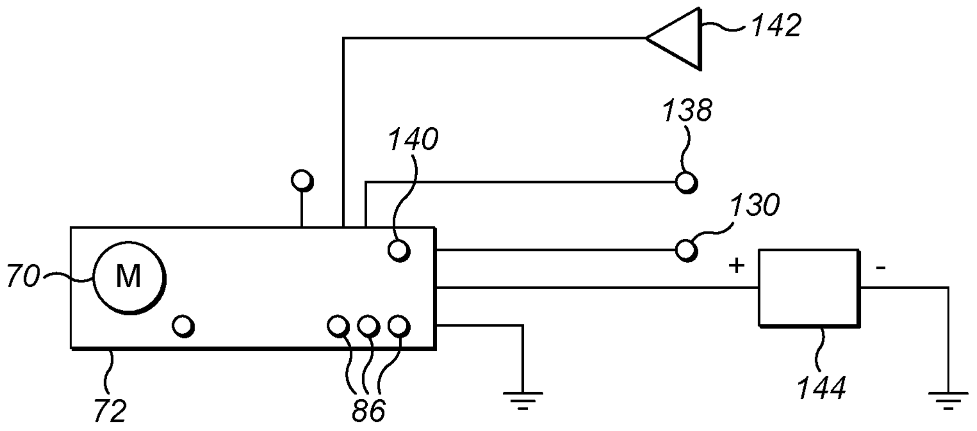
FIG. 9 schematically shows various sensors, inputs and a printed circuit board/controller forming part of an electrical system of the automobile of FIG. 8.

As shown in FIG. 9, electrical system equipment 144 such as a battery and/or voltage regulator may be employed for providing electrical power to the PCB/controller 72 and its motor 70.

The embodiment described is highly advantageous for various reasons. For example, the front trunk lid may be gently lowered by the user to the secondary latch configuration shown in FIG. 2 and then there is a smooth clinch-action closing of the front trunk lid 18 to the primary latch configuration shown in FIG. 3 without any engagement of the second catch 56 with the striker 38 and this provides a very quiet and smooth closing operation compared to prior arrangements where the front trunk lid needs to be slammed or pushed shut. Also, the use of a latching system 36 which can provide all of the primary, secondary and tertiary latch configurations is highly advantageous, especially in that only one motor 70 needs to be used as well as only one actuation member 62 for operating all three of the first catch 54, second catch 56 and pawl member 60 and only one driver/roller 116 is needed to act upon both of the first catch 54 and the pawl member 60. Furthermore, the operation of the second catch 56 from its rest configuration to its latch configuration in which the latching system 36 takes up its tertiary latched configuration can be controlled to be operated at any point in time and/or any predetermined given speed of the automobile 10. Furthermore, the design of the second catch 56 including its hook 88 and its second catch cam follower surface 94, as well as the design of the output member camming surface 132, provides for an exceptionally strong engagement of the striker 38 by the second catch 56 when necessary and this great strength can be provided in a latching system 36 which is extremely small and lightweight and only requires one small motor to operate it. Furthermore, the PCB/controller 72 can be easily set up to detect all states of the latching system 36 and report them to the automobile 10 through CAN-Bus or other protocol as desired.

Furthermore, the manual release cam 64 is provided for operation against the input cam 113 or against a member (not shown) extending from the input cam 113 for rotating the actuation member 62 to enable release of the striker 38 by rotating the actuation member 62 such that the pawl member 60 disengages from the first catch 54 and the double-acting return spring 128 may enable disengagement of the second catch 56 once the motor drive cam 66 has been rotated back out of the FIG. 5 position thereof, either electrically by the motor 70 or by pushing using a hand tool. For example, with the automobile 10 stationary and the signal given to power the vehicle down, the cam 66 may be rotated by the motor 70 from the configuration of FIG. 5 to the configuration of FIG. 2. Thereafter, the manual release cam 64 may be operated by a cable (not shown) to rotate the actuation member 62 to disengage the first catch 54 and the double-acting return spring 128 may then disengage the second catch 56 by rotation of the actuation member 62 in the opposite direction when the manual release cam 64 is rotated back to its start position shown in FIG. 1.

Various modifications may be made to the embodiment described without departing from the scope of the invention as defined by the accompanying claims.

What is claimed:

1. A latching system for latching a movable panel such as an automotive movable panel of an automobile, the system comprising:

a striker movable relative to a first and a second catches, the first and second catches are configured to limit movement of the striker relative thereto;

a motor configured to drive both of the catches to at least a position in which movement of the striker is restricted by the catches, an actuation member comprising a second catch cam which is adapted to engage a cam follower of the second catch to move the second catch to a latch position thereof;

a controller configured to cause movement of the second catch to a latch position arranged to limit movement of the striker, where the controller is further configured to process a signal based upon an automotive speed and to cause movement of the second catch to the latch position in response to the signal when the signal indicates the automotive speed is above a predetermined threshold;

a bias or spring configured to move the second catch to a rest position that is out of the way of movement of the striker;

wherein the second catch cam and cam follower of the second catch are provided with cooperating surfaces which face one another, a plane through and normal to said cooperating surfaces passing through or substantially through a centre of rotation of the actuation member when the second catch is locked in the latch position by the engagement of the second catch cam and cam follower; and wherein the cooperating surfaces are circular arc portions with their centres at the centre of rotation of the actuation member.

2. A latching system as claimed in claim 1, in which the motor is arranged to move the striker to and lock the striker in a primary latched position of the movable front panel.

3. A latching system as claimed in claim 1, wherein the automobile further comprises a bodywork, wherein:

the striker is mounted on one of the moveable panel or the bodywork;

the first catch mounted on the other of the moveable panel or the bodywork; and the motor is further configured to drive the first catch to move and lock the striker to in a primary latched position of the moveable panel relative to the bodywork.

4. A latching system as claimed in claim 3 in which the motor is further configured to drive the first catch to move the striker from a secondary latched position to the primary latched position, the striker being between a fully open position thereof and the primary latched position when in the secondary latched position.

5. A latching system as claimed in claim 1, wherein the controller is further configured to receive a signal representative of a zero vehicle speed and a signal representative of a panel open request to cause the second catch to be moved to the rest position.

6. A latching system as claimed in claim 5 in which the motor is further configured to rotate a motor cam to drive a cam follower of an actuation member rotatably mounted on a body of the latching system.

7. A latching system as claimed claim 5 in which the first catch is provided in the form of a claw having a jaw which is configured to be engaged by the striker for rotation of the claw about a claw pivot.

8. A latching system as claimed in claim 7 further comprising a pawl member, wherein one of the claw and the pawl member has a first lock surface and the other of the claw and the pawl member has at least one further lock surface adapted to lockingly engage said first lock surface.

9. A latching system as claimed in claim 8 in which the first lock surface comprises a pawl lock surface of the pawl member and the at least one further lock surface comprises two locking notches of the claw which are selectively engageable by the pawl lock surface.

10. A latching system as claimed in claim 9 in which the pawl lock surface and locking notches are arranged to engage one another in at least one latched position of the claw and in which a bias such as a spring is provided for moving the claw from said latched position to an open position thereof.

11. A latching system as claimed in claim 1, in which the second catch has a hook at one end thereof, and comprises a latch position that is configured to catch the striker during movement of the striker, where the hook has a hook surface which extends substantially arcuately and tangentially relative to a pivot of the second catch, the hook surface preferably being substantially on an arc centred on such pivot.

12. A latching system as claimed in claim 11, in which the second catch, the pivot for the second catch and the striker are arranged such that, upon the striker pulling the hook in a pull direction, the hook surface is on the striker side of an imaginary plane passing through the pivot of the second catch and parallel to the pull direction.

13. A latching system as claimed in claim 1 in which the second catch cam is fixed to a shaft extending from a main body part of the actuation member.

14. A latching system as claimed in claim 13 which includes a driver mounted on the shaft between the main body part and the second catch cam.

15. A latching system as claimed in claim 14 in which the driver is adapted to drive the first catch from the secondary latched position to the primary latched position.

* * * * *